(12) United States Patent
Chen et al.

(10) Patent No.: US 11,801,497 B2
(45) Date of Patent: Oct. 31, 2023

(54) HYDRO DEOXYGENATION CATALYST, A FIXED BED TANDEM CATALYTIC REACTOR, A METHOD FOR PREPARING HYDROGEN AND A METHOD FOR PREPARING BIOFUEL FROM BIOMASS

(71) Applicants: NORWEGIAN UNIVERSITY OF SCIENCE AND TECHNOLOGY NTNU, Trondheim (NO); SINTEF AS, Trondheim (NO); QUANTAFUEL ASA, Oslo (NO)

(72) Inventors: De Chen, Trondheim (NO); Kumar Ranjan Rout, Trondheim (NO); Isaac Yeboah, Trondheim (NO)

(73) Assignees: NORWEGIAN UNIVERSITY OF SCIENCE AND TECHNOLOGY NTNU, Trondheim (NO); SINTEF AS, Trondheim (NO); QUANTAFUEL ASA, Oslo (NO)

( * ) Notice: Subject to any disclaimer, the term of this patent is extended or adjusted under 35 U.S.C. 154(b) by 0 days.

(21) Appl. No.: 17/423,040

(22) PCT Filed: Jan. 15, 2020

(86) PCT No.: PCT/EP2020/050929
§ 371 (c)(1),
(2) Date: Jul. 14, 2021

(87) PCT Pub. No.: WO2020/148343
PCT Pub. Date: Jul. 23, 2020

(65) Prior Publication Data
US 2022/0072519 A1    Mar. 10, 2022

(30) Foreign Application Priority Data
Jan. 15, 2019  (GB) .................................... 1900553

(51) Int. Cl.
| | | |
|---|---|---|
| B01J 27/19 | (2006.01) | |
| B01J 21/04 | (2006.01) | |
| C10G 3/00 | (2006.01) | |

(52) U.S. Cl.
CPC ............... B01J 27/19 (2013.01); B01J 21/04 (2013.01); C10G 3/45 (2013.01); C10G 3/48 (2013.01);
(Continued)

(58) Field of Classification Search
CPC . B01J 8/0492; B01J 21/04; B01J 27/19; B01J 37/0205; B01J 37/16; B01J 37/18;
(Continued)

(56) References Cited

U.S. PATENT DOCUMENTS

| | | | |
|---|---|---|---|
| 5,026,536 A | | 6/1991 | Shioiri et al. |
| 5,969,189 A | * | 10/1999 | Holtzapple .............. B01J 8/087 |
| | | | 568/397 |

(Continued)

FOREIGN PATENT DOCUMENTS

| | | |
|---|---|---|
| EP | 1 424 320 A1 | 6/2004 |
| RU | 2 496 577 C1 | 10/2013 |

OTHER PUBLICATIONS

Singh, A. P.; Agarwal, A. K.; Agarwal, R. A.; Dhar, A.; Shukla, M. K., Introduction of Alternative Fuels. In Prospects of Alternative Transportation Fuels, Singh, A. P.; Agarwal, R. A.; Agarwal, A. K.; Dhar, A.; Shukla, M. K., Eds. Springer Singapore: Singapore, 2018; pp. 3-6.

(Continued)

Primary Examiner — Brian A McCaig
(74) Attorney, Agent, or Firm — Casimir Jones, S.C.; Robert A. Goetz

(57) ABSTRACT

The present invention relates to processes for the preparation of biofuel from biomass by fast hydropyrolysis or fast (Continued)

pyrolysis, using hydrogen generated by sorption enhanced steam reforming. The present invention also relates to fixed bed tandem catalytic-upgrading processes, and reactors and hydrodeoxygenation (HDO) catalysts useful in those processes.

16 Claims, 4 Drawing Sheets

(52) U.S. Cl.
CPC .................. *C10G 3/50* (2013.01); *C10G 3/54* (2013.01); *C10G 2300/1014* (2013.01); *C10G 2400/26* (2013.01)

(58) Field of Classification Search
CPC ........ B01J 2208/025; C10G 3/44; C10G 3/45; C10G 3/48; C10G 3/50; C10G 3/54; C10G 2300/1014; C10G 2400/26; C01B 3/38; C01B 3/44; C01B 3/508; C01B 2203/0233; C01B 2203/0283; C01B 2203/0425; C01B 2203/0475; C01B 2203/06; C01B 2203/1052; C01B 2203/1064; C01B 2203/1082; C01B 2203/1235; Y02P 20/52; Y02P 30/00; Y02P 30/20
See application file for complete search history.

(56) References Cited

U.S. PATENT DOCUMENTS

| | | | |
|---|---|---|---|
| 9,464,234 B1 | 10/2016 | Tharpe, Jr. | |
| 2006/0054536 A1* | 3/2006 | Fujikawa | C10G 45/08 502/182 |
| 2010/0228062 A1 | 9/2010 | Babicki et al. | |
| 2013/0017590 A1 | 1/2013 | Chung et al. | |
| 2013/0144090 A1 | 6/2013 | Pansare et al. | |
| 2013/0237728 A1 | 9/2013 | Lotero et al. | |
| 2014/0179967 A1 | 6/2014 | Lee et al. | |

OTHER PUBLICATIONS

Gutiérrez-Antonio, C.; Gómez-Castro, F. I.; de Lira-Flores, J. A.; Hernández, S., A review on the production processes of renewable jet fuel. Renewable and Sustainable Energy Reviews 2017, 79, 709-729.
A., A. N. I.; Moiz, B.; Muaz, S.; A., C. H.; M., E. H. M.; O., E. N., Optimization of the Aromatic/Paraffinic Composition of Synthetic Jet Fuels. Chemical Engineering & Technology 2016, 39 (12), 2217-2228.
Link, D. D.; Gormley, R. J.; Baltrus, J. P.; Anderson, R. R.; Zandhuis, P. H., Potential Additives to Promote Seal Swell in Synthetic Fuels and Their Effect on Thermal Stability. Energ Fuel 2008, 22 (2), 1115-1120.
Davda, R. R.; Shabaker, J. W.; Huber, G. W.; Cortright, R. D.; Dumesic, J. A., A review of catalytic issues and process conditions for renewable hydrogen and alkanes by aqueous-phase reforming of oxygenated hydrocarbons over supported metal catalysts. Appl Catal B-environ 2005, 56 (1-2), 171-186.
Corma, A.; Iborra, S.; Velty, A., Chemical routes for the transformation of biomass into chemicals. Chem Rev 2007, 107 (6), 2411-2502.
Huber, G. W.; Iborra, S.; Corma, A., Synthesis of transportation fuels from biomass: Chemistry, catalysts, and engineering. Chemical Reviews 2006, 106 (9), 4044-4098.
Carlos Serrano-Ruiz, J.; Dumesic, J. A., Catalytic routes for the conversion of biomass into liquid hydrocarbon transportation fuels. Energy & Environmental Science 2011, 4 (1), 83-99.
Li, C.; Zheng, M.; Wang, A.; Zhang, T., One-pot catalytic hydrocracking of raw woody biomass into chemicals over supported carbide catalysts: simultaneous conversion of cellulose, hemicellulose and lignin. Energ Environ Sci 2012, 5 (4), 6383-6390.
Ji, N.; Zhang, T.; Zheng, M.; Wang, A.; Wang, H.; Wang, X.; Chen, J. G., Direct Catalytic Conversion of Cellulose into Ethylene Glycol Using Nickel-Promoted Tungsten Carbide Catalysts. Angew Chem Int Edit 2008, 47 (44), 8510-8513.
Alonso, D. M.; Bond, J. Q.; Dumesic, J. A., Catalytic conversion of biomass to biofuels. Green Chem 2010, 12 (9), 1493-1513.
Rytter, E.; Ochoa-Fernández, E.; Fahmi, A., Catalytic Process Development for Renewable Materials: Biomass-to-Liquids by the Fischer-Tropsch process. Wiley: 2013.
Mohan, D.; Pittman, C. U.; Steele, P. H., Pyrolysis of wood/biomass for bio-oil: A critical review. Energ Fuel 2006, 20 (3), 848-889.
Zacher, A. H.; Olarte, M. V.; Santosa, D. M.; Elliott, D. C.; Jones, S. B., A review and perspective of recent bio-oil hydrotreating research. Green Chem 2014, 16 (2), 491-515.
Resende, F. L. P., Recent advances on fast hydropyrolysis of biomass. Catalysis Today 2016, 269, 148-155.
Balagurumurthy, B.; Bhaskar, T., Hydropyrolysis of lignocellulosic biomass: state of the art review. Biomass Conversion and Biorefinery 2013, 4 (1), 67-75.
Thangalazhy-Gopakumar, S.; Adhikari, S.; Gupta, R. B., Catalytic Pyrolysis of Biomass over H+ZSM-5 under Hydrogen Pressure. Energ Fuel 2012, 26 (8), 5300-5306.
Marker, T. L.; Felix, L. G.; Linck, M. B.; Roberts, M. J.; Ortiz-Toral, P.; Wangerow, J., Integrated hydropyrolysis and hydroconversion (IH2®) for the direct production of gasoline and diesel fuels or blending components from biomass, Part 2: continuous testing. Environmental Progress & Sustainable Energy 2014, 33 (3), 762-768.
Marker, T. L.; Felix, L. G.; Linck, M. B.; Roberts, M. J., Integrated hydropyrolysis and hydroconversion (IH2) for the direct production of gasoline and diesel fuels or blending components from biomass, part 1: Proof of principle testing. Environmental Progress & Sustainable Energy 2012, 31 (2), 191-199.
Venkatakrishnan, V. K.; Degenstein, J. C.; Smeltz, A. D.; Delgass, W. N.; Agrawal, R.; Ribeiro, F. H., High-pressure fast-pyrolysis, fast-hydropyrolysis and catalytic hydrodeoxygenation of cellulose: production of liquid fuel from biomass. Green Chem 2014, 16 (2), 792-802.
Venkatakrishnan, V. K.; Delgass, W. N.; Ribeiro, F. H.; Agrawal, R., Oxygen removal from intact biomass to produce liquid fuel range hydrocarbons via fast-hydropyrolysis and vapor-phase catalytic hydrodeoxygenation. Green Chemistry 2015, 17 (1), 178-183.
Abanades, J. C., The maximum capture efficiency of CO2 using a carbonation/calcination cycle of CaO/CaCO3. Chem. Eng. J. 2002, 90 (3), 303-306.
Ayalur Chattanathan, S.; Adhikari, S.; Abdoulmoumine, N., A review on current status of hydrogen production from bio-oil. Renewable and Sustainable Energy Reviews 2012, 16 (5), 2366-2372.
Noor, T.; Gil, M. V.; Chen, D., Production of fuel-cell grade hydrogen by sorption enhanced water gas shift reaction using Pd/Ni—Co catalysts. Appl. Catal. B-Environ. 2014, 150-151 (0), 585-595.
Fermoso, J.; Rubiera, F.; Chen, D., Sorption enhanced catalytic steam gasification process: a direct route from lignocellulosic biomass to high purity hydrogen. Energy Environ. Sci. 2012, 5 (4), 6358-6367.
Fermoso, J.; Gil, M. V.; Rubiera, F.; Chen, D., Multifunctional Pd/Ni—Co Catalyst for Hydrogen Production by Chemical Looping Coupled With Steam Reforming of Acetic Acid. ChemSusChem 2014, 7 (11), 3063-3077.
Du, J.; Say, R. F.; Lü, W.; Fuchs, G.; Einsle, O., Active-site remodelling in the bifunctional fructose-1,6-bisphosphate aldolase/phosphatase. Nature 2011, 478, 534.
Xia, Q. N.; Cuan, Q.; Liu, X. H.; Gong, X. Q.; Lu, G. Z.; Wang, Y. Q., Pd/NbOPO4 multifunctional catalyst for the direct production of liquid alkanes from aldol adducts of furans. Angewandte Chemie International Edition 2014, 53 (37), 9755-9760.

(56) References Cited

OTHER PUBLICATIONS

Gollwitzer, A.; Dietel, T.; Kretschmer, W. P.; Kempe, R., A broadly tunable synthesis of linear α-olefins. Nature Communications 2017, 8 (1), 1226.

Sutton, A. D.; Waldie, F. D.; Wu, R.; Schlaf, M.; 'Pete' Silks Iii, L. A.; Gordon, J. C., The hydrodeoxygenation of bioderived furans into alkanes. Nature Chemistry 2013, 5, 428.

Mo, F.; Dong, G., Regioselective ketone α-alkylation with simple olefins via dual activation. Science 2014, 345 (6192), 68-72.

Ose, T.; Watanabe, K.; Mie, T.; Honma, M.; Watanabe, H.; Yao, M.; Oikawa, H.; Tanaka, I., Insight into a natural Diels-Alder reaction from the structure of macrophomate synthase. Nature 2003, 422, 185.

Anbarasan, P.; Baer, Z. C.; Sreekumar, S.; Gross, E.; Binder, J. B.; Blanch, H. W.; Clark, D. S.; Toste, F. D., Integration of chemical catalysis with extractive fermentation to produce fuels. Nature 2012, 491, 235.

Climent, M. J.; Corma, A.; Iborra, S., Conversion of biomass platform molecules into fuel additives and liquid hydrocarbon fuels. Green Chemistry 2014, 16 (2), 516-547.

Young, Z. D.; Hanspal, S.; Davis, R. J., Aldol Condensation of Acetaldehyde over Titania, Hydroxyapatite, and Magnesia. ACS Catalysis 2016, 6 (5), 3193-3202.

Sun, D.; Moriya, S.; Yamada, Y.; Sato, S., Vapor-phase self-aldol condensation of butanal over Ag-modified TiO2. Applied Catalysis A: General 2016, 524, 8-16.

Gayubo, A. G.; Aguayo, A. T.; Atutxa, A.; Aguado, R.; Olazar, M.; Bilbao, J., Transformation of oxygenate components of biomass pyrolysis oil on a HZSM-5 zeolite. II. Aldehydes, ketones, and acids. Industrial & Engineering Chemistry Research 2004, 43 (11), 2619-2626.

Gurbuz, E. I.; Kunkes, E. L.; Dumesic, J. A., Dual-bed catalyst system for C-C coupling of biomass-derived oxygenated hydrocarbons to fuel-grade compounds. Green Chemistry 2010, 12 (2), 223-227.

Mortensen, P. M.; Grunwaldt, J.-D.; Jensen, P. A.; Jensen, A. D., Screening of Catalysts for Hydrodeoxygenation of Phenol as a Model Compound for Bio-oil. ACS Catalysis 2013, 3 (8), 1774-1785.

Whiffen, V. M. L.; Smith, K. J.; Straus, S. K., The influence of citric acid on the synthesis and activity of high surface area MoP for the hydrodeoxygenation of 4-methylphenol. Applied Catalysis A: General 2012, 419, 111-125.

Peroni, M.; Lee, I.; Huang, X.; Baráth, E.; Gutiérrez, O. Y.; Lercher, J. A., Deoxygenation of Palmitic Acid on Unsupported Transition-Metal Phosphides. ACS Catalysis 2017, 7 (9), 6331-6341.

Bonita, Y.; Hicks, J. C., Periodic Trends from Metal Substitution in Bimetallic Mo-Based Phosphides for Hydrodeoxygenation and Hydrogenation Reactions. The Journal of Physical Chemistry C 2018, 122 (25), 13322-13332.

Rensel, D. J.; Rouvimov, S.; Gin, M. E.; Hicks, J. C., Highly selective bimetallic FeMoP catalyst for C—O bond cleavage of aryl ethers. Journal of Catalysis 2013, 305, 256-263.

Rensel, D. J.; Kim, J.; Jain, V.; Bonita, Y.; Rai, N.; Hicks, J. C., Composition-directed FeXMo2-XP bimetallic catalysts for hydrodeoxygenation reactions. Catalysis Science & Technology 2017, 7 (9), 1857-1867.

Rensel, D. J.; Kim, J.; Bonita, Y.; Hicks, J. C., Investigating the multifunctional nature of bimetallic FeMoP catalysts using dehydration and hydrogenolysis reactions. Applied Catalysis A: General 2016, 524, 85-93.

Jain, V.; Bonita, Y.; Brown, A.; Taconi, A.; Hicks, J. C.; Rai, N., Mechanistic insights into hydrodeoxygenation of phenol on bimetallic phosphide catalysts. Catalysis Science & Technology 2018, 8 (16), 4083-4096.

Elliott, D. C.; Hart, T. R., Catalytic Hydroprocessing of Chemical Models for Bio-oil. Energ Fuel 2009, 23 (2), 631-637.

W., N. M.; H., S. B., A Perspective on Catalytic Strategies for Deoxygenation in Biomass Pyrolysis. Energy Technology 2017, 5 (1), 7-18.

Si, Z.; Zhang, X.; Wang, C.; Ma, L.; Dong, R., An Overview on Catalytic Hydrodeoxygenation of Pyrolysis Oil and Its Model Compounds. 2017, 7 (6), 169.

Zhao, T.; Boullosa-Eiras, S.; Yu, Y.; Chen, D.; Holmen, A.; Ronning, M. J. T. i. C., Synthesis of Supported Catalysts by Impregnation and Calcination of Low-Temperature Polymerizable Metal-Complexes. 2011, 54 (16), 1163.

Boullosa-Eiras, S.; Zhao, T.; Chen, D.; Holmen, A., Effect of the preparation methods and alumina nanoparticles on the catalytic performance of Rh/ZrxCe1-xO2-Al2O3 in methane partial oxidation. Catalysis Today 2011, 171 (1), 104-115.

Y. Weng et al., "One-pot aqueous phase catalytic conversion of sorbitol to gasoline over nickel catalyst". Energy Conversion and Management, 94, 95-102, 2015.

J. Fermoso et al, "Sorption enhanced steam reforming (SESR): a direct route towards efficient hydrogen production from biomass-derived compounds". Journal of Chemical Technology and Biotechnology, 87, 1367-1374, 2012.

B. Dou et al, "Fluidized-bed gasification combined continuous sorption-enhanced steam reforming system to continuous hydrogen production from waste plastic". International Journal of Hydrogen Energy, 41, 3803-3810, 2016.

International Search Report & Written Opinion, International Patent Application No. PCT/EP2020/050929, dated Jul. 20, 2020, 8 pages.

\* cited by examiner

HYDRO DEOXYGENATION CATALYST, A FIXED BED TANDEM CATALYTIC REACTOR, A METHOD FOR PREPARING HYDROGEN AND A METHOD FOR PREPARING BIOFUEL FROM BIOMASS

FIELD OF THE INVENTION

The present invention relates to processes for the preparation of biofuel from biomass by fast hydropyrolysis or fast pyrolysis, using hydrogen generated by sorption enhanced steam reforming. The present invention also relates to fixed bed tandem catalytic-upgrading processes, and reactors and hydrodeoxygenation (HDO) catalysts useful in those processes.

BACKGROUND TO THE INVENTION

The increasing economic development facilitating globalization has caused a remarkably increases in the energy demand. Currently, fossil fuel accounts for about 80% of the global energy consumption and 95% of the transport energy demand[1]. The transportation sector currently relies almost exclusively on liquid hydrocarbons as its energy source. Production of liquid fuels from biomass can help solve the problem of $CO_2$ emission from the transportation sector because $CO_2$ released from vehicle exhaust is captured during biomass growth.

The aviation sector is deemed as one of the difficult-to-decarbonize areas and thus research into renewable jet-fuel range hydrocarbon is great, especially the liquid transport fuel and the aviation fuel. The typical composition of commercial jet-A range (aviation) fuel is made up paraffins, isoparaffins, olefins, naphthenes and aromatics of standard vol % limitation of 20, 33, 6, 13 and 26, respectively. The hydrocarbon carbon length usually contains ca.98% of $C_8$-$C_{13}$ linear, branched, cyclic and aromatic backbone[2,3]. The functionality of each components enhances either the combustion, thermal stability, fluidity, flying easiness and safety requirements and as such, the mixture of multi-functionality is mandatory for the aviation turbine engine[3]. Most especially the safety functionality produced by aromatic backbone such as aiding the elastomeric swelling O-rings in fuel tanks[3] and thereby reducing leakage of the most volatile fraction of the fuel is of high necessity[4]. However, the production of aromatics from lignocellulose biomass has attracted less research focus and attention.

The molecules present in biomass are complex and strongly functionalized, resulting in a low energy density (compared to hydrocarbons). However, the functionalized complex molecules provide diverse reaction pathways to different intermediate molecules. Biomass consists typically of 40-45% cellulose, 15-30% hemicellulose and 10-25% lignin. Full utilization of all the biomass components is essential for achieving high energy efficiency and becoming highly economically competitive to fossil fuels. There are three platforms available for biomass conversion to fuels and chemicals: the gasification, pyrolysis and hydrolysis (sugar) platforms[5-7].

The sugar platform involves pre-treatment of biomass and hydrolysis to sugars and polyolic platform molecules followed by conversion of the platform molecules to chemicals and fuels. The drawback of this platform is that the lignin component cannot be utilized in the aqueous phase processing of biomass, and is typically combusted to generate heat and power[8]. Recently an alternative catalytic pathway has been reported, in which lignocellulosic biomass is directly converted to polyols over a heterogeneous catalyst in the presence of hydrogen. The process was named one-pot catalytic conversion of raw woody biomass[9,10], which is a hydrothermal liquefaction process. Subsequent deoxygenation and C—C coupling reactions can convert these polyols to liquid transportation fuels. The remarkable fact about this catalytic pathway is that the expensive pre-treatment step is eliminated, and the catalytic system allows high selectivity towards certain polyols, such as ethylene glycol (EG) and propanediol (1,2-PG)[11]. Although it is understood that catalysis is the central tool in improving efficiency in these conversion processes, from the technical realization is far away due to our inability to control the selectivity and by-product formation.

The (biomass) gasification platform produces synthesis (syn) gas as the intermediate carbon source for subsequent fuel synthesis, either Fischer-Tropsch (FT) synthesis or methane/dimethylether (DME) synthesis, to produce biofuels. The FT synthesis route is advantageous due to providing diesel range fuels.

Generally, there are three main steps in the biomass-to-liquid (BtL) FT synthesis. The FT synthesis was discovered in 1923 by Franz Fischer and Hans Tropsch. After that, several industrial plants have been built around the world using syngas from methane reforming or coal gasification. However, as of now, there are no commercial scale BtL plants like those installed for (coal-to-liquid) CtL or gas-to-liquid (GtL). Most of the BtL plants are either on demonstration- or experimental-scale. Although there are several large-scale biomass gasification systems employed for electricity generation and thermal applications, it is only recently that research has concentrated on converting bio-syngas to higher hydrocarbons via the FT process. The overall process involves complete bond cleavage of biomass molecules followed by bond re-formation for fuel production. This results in a relatively low energy efficiency[7].

A main advantage of the BtL FT is that the basic technology is established, in contrast to the other routes. Nevertheless, the major disadvantage of this process is that this process has a low process thermal efficiency (PTE). Thus, a large amount of the energy content in biomass is irreversibly lost in the biomass conversion steps (typically around 16-50%). Gasification of the biomass has a PTE of 75%, which represents the maximum PTE possible from syn-gas derived fuels. Taking into account the energy required to produce and transport the biomass decreases the thermal efficiency even further. The losses of energy in a bio-based FT-plant are linked with the gasification (23% loss), steam generation (9% loss) and energy recovery as power (24% loss). A maximum attainable energy efficiency is reported to be 46.2%, including about 4% as electricity[7]. The process is multi-step, each step with specific challenges[12].

In the fast pyrolysis platform, biomass is heated rapidly to 300° C. to 600° C. in the absence of air, thereby producing black bio-oils containing tars, aromatics, acids, alcohols, aldehydes and other mixed oxygenates. It is a promising process to convert large volume biomass in-situ to bio-oils with a high yield (typically 75%)[13]. It makes it easy to transport bio-oils instead of biomass. However, properties such as low heating value due to high moisture content (15-30%), high corrosivity (pH about 2.5), high viscosity, incompatibility with conventional fuels, ash content, incomplete volatility and chemical instability (high contents of aldehydes, ketones and carboxyl acids) negatively affect the quality of bio-oil as a transportation fuel[7]. An upgrading process is necessary to convert bio-oil into a ready alternative to the petroleum fuel in the transportation industry.

Although hydrodeoxygenation (HDO) has been extensively studied to upgrade bio-oils, upgrading bio-oils to fuels and chemicals remains a formidable challenge, partially due to the complexity in composition with more than 300 compounds[14,15].

In recent years, fast hydropyrolysis (FHP) has gained significant attention[16,17]. In fast hydropyrolysis, biomass is heated rapidly to 450° C. to 600° C. in a $H_2$ environment. In this process, the reducing $H_2$ gas generates radicals, which reacts with volatiles released by biomass usually with catalyst named as catalytic FHP, that removes oxygen in the form of $H_2O$, CO, and $CO_2$, which lowers the possibility of coking of catalyse[18]. However, this process based on 'in-situ' catalysis due to which the pyrolysis and catalysis processes such as catalytic HDO are constrained by the same reaction conditions (e.g. same temperature) even though the optimum conditions for each of the process steps might be different. To avoid this problem, Gas Technology Institute, USA, (GTI) proposed catalytic FHP with ex-situ HDO named as "integrated hydropyrolysis and hydroconversion" (IH2®) technology[19,20]. Nevertheless, from the catalysis prospective, the effect of having catalysis in both the primary FHP unit and secondary HDO unit is unclear[16].

As an alternative, there is the H2BioOil process proposed by Purdue University[21,22], which has non-catalytic FHP with ex-situ HDO. In this process, vapour phase catalytic upgrading is done to avoid secondary reactions during condensation and re-vaporization of the pyrolysis vapours. The main advantage of this process is that the conversion process is envisioned to operate at high $H_2$ partial pressures, so the HDO reaction rates will be higher due to increased availability of hydrogen at high partial pressures[21,22]. However, introduction of $H_2$ and high pressure is expensive. Therefore, to make the process energy efficient and economical, a novel process is needed, which can operate at low pressure and $H_2$.

The $H_2$ needed for hydropyrolysis has generally been derived from steam reforming of methane or gasification of coal or biomass, both of which will lead to the discharge of $CO_2$ in the atmosphere. Recently, it has been proposed that $H_2$ can be produced from the CO and $C_1$-$C_4$ hydrocarbons from HDO reactors, by reforming[22]. However, that process needs costly hydrogen separation process to remove $CO_2$ before the hydrogen can be fed into the FHP reactor.

Bio-oil, generated from lignocellulosic biomass, usually consists of $C_1$-$C_4$ light functionalized oxygenates (20%) including aliphatic alcohols, ketones, aldehyde. These oxygenates are thermally and chemically unstable and can be further oxidized to form corrosive acids or low-heating value liquid products. Bio-oil can be upgraded to transport fuel and chemicals via complex reactions (e.g., such as aldol condensation[28,29] oligomerization[30], ketonization[31], hydroalkylation/alkylation[32], diels-alder[33], guerbet[34] and acylation[35] over catalysts such as $TiO_2$[36,37] and HZSM-5[38]). However, there are usually three to four reactors operated in cascade mode[39], and the catalysts usually suffer from severe deactivation and carbon loss as light alkenes and alkanes. The most products have less aromatics hydrocarbon content but greater light gases, gasoline and diesel range products[20,21].

In this perspective is desirable to rationally design catalysts of multifunctional nature and more effective catalytic process that can selectively produce biofuels with tuneable selectivity and low yield of light hydrocarbons as well as low oxygen content. However, selective oxygen removal reaction from methoxy and hydroxy phenolics is still a challenge due to a kinetic competition between the selective hydrodeoxygenation and the selective hydrogenation of aromatic rings. The selective hydrodeoxygenation entails the direct C—O bond cleavage. The phenolic C—O bond energy is large (468 kJ/mol) and therefore makes direct hydrodeoxygenation a challenge. Hydrodeoxygenation (HDO) of phenolic compounds was typically carried out at very high pressures (100 bar $H_2$) on catalysts such as Ni/$ZrO_2$[40].

The high hydrogen transfer activity of phosphides incorporated transition metal catalyst (MoP, $Fe_2P$, $Ni_2P$, CoP and WP) have been widely applied in fossil fuel upgrading towards hydrodenitrogenation and hydrodesulphurization reactions[41-43]. FeMo phosphide catalyst could selectively cleave C—O instead of hydrogenating the aromatic ring. Recently, Jason C Hicks et al. have reported highly selective catalysts, FeMoP, NiMoP, RuMoP, for C—O bond cleavage of aryl ethers or phenolics to aromatics at low pressure, 2.1 MPa $H_2$ and temperature, 400° C. at near conversion of model reactants[43-47]. Besides, the understanding of hydrodeoxygenation reactions has been mostly studied using single modelled phenolic components[48,49], such as creosol, guaiacol, phenol, anisole, to yield monocyclic aromatics[50]. However, it is highly desired to improve the catalysts and explore them to more realistic bio-oil mixture at industrial relevant conditions.

In view of the above, there remains a need for improved processes for preparing biofuel, particularly jet fuel, from biomass.

SUMMARY OF THE INVENTION

The present invention arises from the surprising finding that it is possible to prepare biofuel (i.e. liquid hydrocarbons) by fast hydropyrolysis or fast pyrolysis of biomass, and then using $H_2$ generated by sorption enhanced steam reforming (SESR) of light (i.e. $C_1$-$C_4$) hydrocarbons for the fast hydropyrolysis and/or for hydrodeoxygenation (HDO) reactions in a catalytic upgrading reactor. The $C_1$-$C_4$ hydrocarbons are themselves generated during the fast hydropyrolysis or fast pyrolysis step, and a significant proportion survive the catalytic upgrading reactions. The SESR produces $H_2$ at a high yield and purity, and without the requirement for subsequent purification (e.g. to remove $CO_2$) prior to introduction into the fast hydropyrolysis reactor and/or into the catalytic upgrading reactor.

A further surprising finding of the present invention is that it is possible to upgrade the bio-vapour and/or bio-oil that is initially generated following fast hydropyrolysis of biomass using a fixed bed tandem catalytic-upgrading reactor that contains both an C—C coupling catalyst and a hydrodeoxygenation (HDO) catalyst, and in which the C—C coupling and HDO catalysts form a dual bed system. By integrating C—C coupling and HDO catalyst in this manner, light (i.e. $C_1$-$C_4$) oxygenates (which are present at significant levels in bio-vapour) are converted into $C_{5+}$ hydrocarbons (i.e. hydrocarbons containing 5 or more carbon atoms, particularly $C_{9+}$ hydrocarbons) with high yield and purity, such that these hydrocarbons are useful as biofuel. Further, high levels of aromatic components have also been found following upgrading. The high levels of $C_{9+}$ hydrocarbons and aromatics are particularly desirable, as these are useful in jet fuels. Moreover, it was possible to use a low temperature of 300-400° C. and low pressure of 5 to 20 bar with the fixed bed tandem catalytic-upgrading reactor.

The present inventors have also demonstrated that the Ru modified MoFeP supported on $Al_2O_3$ acts as an effective HDO catalyst. Together with representative C—C coupling catalysts, this HDO catalyst was used in a fixed bed tandem catalytic-upgrading reactor to upgrade a simulated bio-vapour feed (comprising acetic acid, acetol, furfural, phenol, guaiacol and eugenol with 30 wt % water, which is representative of the bio-vapour generated by fast hydropyrolysis and fast pyrolysis). The resultant product contained high levels of $C_{5+}$ aromatic backbone hydrocarbons, with negligible oxygen content.

Overall, the present invention provides a biomass conversion process that is efficient, can be built on a relatively small to large scales and provides biofuel with a high yield and purity, which can be directly used by the transportation sector.

Accordingly, the present invention provides a hydrodeoxygenation (HDO) catalyst which is $M^1$—$MoM^2P$ supported on a support, wherein $M^1$ and $M^2$ represent transition metals.

The invention further provides a fixed bed tandem catalytic-upgrading reactor suitable for upgrading bio-vapour or bio-oil from fast hydropyrolysis or fast hydropyrolysis into biofuel, wherein: the fixed bed comprises an upstream portion and a downstream portion, the upstream portion comprises an C—C coupling catalyst, and the downstream portion comprises a hydrodeoxygenation (HDO) catalyst.

The invention further provides a method for preparing hydrogen, the method comprising steam reforming a stream comprising $C_1$-$C_4$ hydrocarbons, CO and $CO_2$ from a catalytic upgrading reactor, preferably a fixed bed tandem catalytic-upgrading reactor of the invention, in the presence of a sorbent suitable for $CO_2$ capture, thereby to produce $H_2$.

The invention further provides a method for preparing biofuel from biomass, the method comprising:
  (a) fast hydropyrolysis or fast pyrolysis of biomass to provide bio-vapour and/or bio-oil; and
  (b) upgrading of the bio-vapour and/or bio-oil from step (a) in a fixed bed tandem catalytic-upgrading reactor of the invention to provide (i) the biofuel, and (ii) a stream comprising $C_1$-$C_4$ hydrocarbons, CO and $CO_2$.

The invention further provides a method for converting bio-vapour and/or bio-oil into biofuel, which method comprises upgrading of the bio-vapour and/or bio-oil in a fixed bed tandem catalytic-upgrading reactor of the invention to provide the biofuel.

DETAILED DESCRIPTION OF THE INVENTION

Figure 1A:
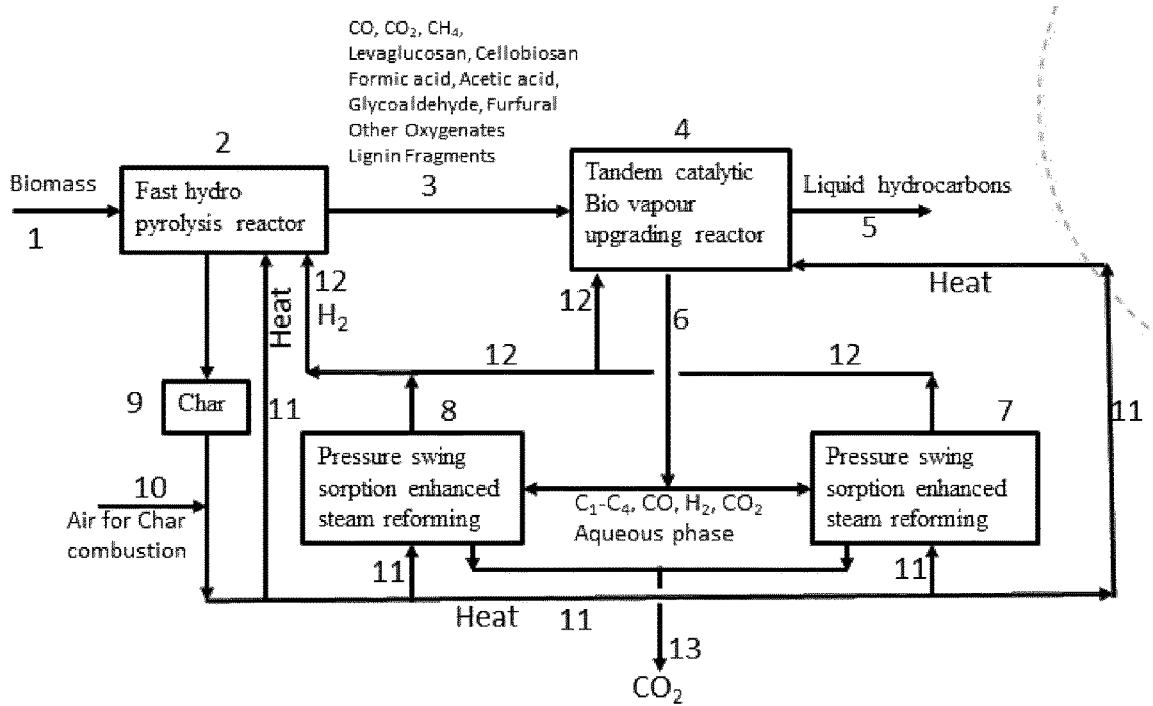
FIG. 1A is a schematic view of the synergistic integration of biofuel (liquid hydrocarbon) synthesis by fast hydropyrolysis of biomass using pressure swing sorption enhanced steam reforming (PS SESR) to produce $H_2$.

The present invention is concerned with the preparation of biofuel from biomass via fast hydropyrolysis or fast pyrolysis of the biomass to produce bio-vapour and/or bio-oil, followed by subsequent upgrading of the bio-vapour and/or bio-oil to produce biofuel.

The overall process, which is described in further detail below, is illustrated by the specific process depicted in FIGS. 1A, 1B, 2A and 2B. In these figures, a conventional fast hydropyrolysis reactor 2 is an apparatus into which biomass 1 is fed, and a mechanism to supply heat 11 and $H_2$ 12 for the pyrolysis is provided. The gases exiting the fast hydropyrolysis reactor 2 are generally sent to a cyclone (not shown) where solid char 9 are separated. This char 9 may be burned to provide heat for pyrolysis and drying. Next, bio-vapour 3 is sent to a tandem catalytic upgrading reactor 4. The biofuel (liquid hydrocarbons) 5 are separated and light gaseous products 6 will go to pressure swing sorption enhanced steam reforming (PS SESR) reactors 7 and 8 in FIGS. 1A and 2A or to a carbonate looping by a circulating fluidized-bed (CFB) reactor 7 and 8 in FIGS. 1B and 2B to produce pure $H_2$, 12. The $CO_2$ captured in the PS SESR reactors will be released 13. The regeneration of $CO_2$ is an endothermic process, requiring heat 11.

The biofuel prepared using the present invention comprises liquid hydrocarbons. The liquid hydrocarbons typically contain five or more carbon atoms ($C_{5+}$ hydrocarbons). Preferably the biofuel prepared using the present invention comprises a high proportion of $C_8$-$C_{13}$ hydrocarbons, such as $C_9$ hydrocarbons. Preferably the biofuel prepared using the present invention also contains a high proportion of aromatics. These longer hydrocarbons and aromatics are particularly useful in the preparation of jet-fuel.

As used herein, the term "biomass" means carbon-containing organic matter, generally derived from plants. Some examples include switchgrass, poplar tree, sugarcane, corn, tree barks, aquatic material including algae, plankton. However, the precise nature of the biomass is not believed to be an important aspect of the invention. Typically, the biomass is lignocellulosic biomass. Preferably, the biomass is woody or agricultural biomass. Preferably the biomass is woody biomass. Typically the biomass is processed, for example by grinding or shredding, such that it is suitable for introduction into the reactor where fast hydropyrolysis or fast pyrolysis occurs.

Any conventional fast hydropyrolysis or fast pyrolysis reactor can be used for the fast hydropyrolysis or fast pyrolysis steps. Fast pyrolysis involves heating the biomass in the reactor in the absence of air (particularly $O_2$). Fast hydropyrolysis involves heating the biomass in the reactor in the presence of hydrogen and the absence of other air (particularly $O_2$). Otherwise, the conditions for fast hydropyrolysis and fast pyrolysis are generally the same. Thus, the processes typically involve heating the biomass to 300° C. to 600° C., preferably 400 to 500° C., for example about 400° C. or about 500° C. The heating is rapid, hence it being "fast" in contrast to slow pyrolysis which mainly produces char. Typically, processes occurs at a pressure of 5 to 50 bar, preferably 5 to 20 bar. Typically heat is supplied at a rate of 1500 to 2500 J/g of biomass, for example about 2000 Jg/biomass. Typically, the flux is above 50 W/cm².

Fast hydropyrolysis and fast pyrolysis convert the biomass into bio-vapour and/or bio-oil. Bio-vapour and bio-oil contain the same components, but referred to as "bio-oil" when in liquid phase at lower temperatures and "bio-vapour" when gaseous phase at higher temperatures. Bio-vapour and bio-oil contain a complex mixture of compounds (e.g. acetic acid, acetol, furfural, phenol, guaiacol, eugenol etc), which will depend to some extent on the exact starting biomass material. In addition, solid char is generally produced during fast hydropyrolysis and fast pyrolysis, and this solid char is typically separated from the bio-vapour and/or bio-oil using routine separation techniques, such as a cyclone. The solid char may be burned to provide heat for other steps in the process of the invention, including the fast hydropyrolysis or fast pyrolysis steps.

The fast hydropyrolysis or fast pyrolysis steps may be carried out in the presence of an HDO catalyst. In that case HDO catalyst is present in the fast hydropyrolysis or fast pyrolysis reactor during pyrolysis. For example, if heat for fast hydropyrolysis or fast pyrolysis is provided through a fluidized bed, then catalyst particles can either be mixed with the material of the fluidized bed or supported on the particles being fluidized. An example would be sand used as a circulating fluidized material to supply heat for fast hydropyrolysis or fast pyrolysis. In such a case, the HDO catalyst may either be mixed with the sand or supported on the sand particles. Typically, however, the fast hydropyrolysis or fast pyrolysis step is carried out in the absence of an HDO catalyst, since upgrading is carried out ex-situ in a subsequent step.

The bio-vapour and/or bio-oil formed from the fast hydropyrolysis or fast pyrolysis step contains a complex mixture of materials, including a significant proportion of light oxygenates. The bio-vapour and/or bio-oil is sent next to a fixed bed tandem catalytic-upgrading reactor. Typically, the bio-vapour and/or bio-oil is cooled (for example in a cooler) prior to entering the fixed bed tandem catalytic-upgrading reactor. That is because the operating temperature of the fixed bed tandem catalytic-upgrading reactor (300 to 400° C.) is may be lower than that of the fast hydropyrolysis reactor (300 to 600° C.). Alternatively, if the bio-vapour and/or bio-oil has been cooled to below the operating temperature of the fixed bed tandem catalytic-upgrading reactor, then the bio-vapour and/or bio-oil can be heated prior to entering the fixed bed tandem catalytic-upgrading reactor.

The fixed bed tandem catalytic-upgrading reactor has a fixed bed which comprises an upstream portion and a downstream portion. The upstream portion comprises a C—C coupling catalyst, and the downstream portion comprises a hydrodeoxygenation (HDO) catalyst. This arrangement is depicted in 4 of FIG. 2. For the avoidance of doubt, the upstream portion comprising a C—C coupling catalyst and downstream portion comprising a hydrodeoxygenation (HDO) catalyst are present in a single fixed bed reactor, and are not present in separate reactors.

The preferred operating temperature of the fixed bed tandem catalytic-upgrading reactor will depend upon the specific C—C coupling and HDO catalysts used, but is typically 300 to 400° C. The preferred operating pressure of the fixed bed tandem catalytic-upgrading reactor will depend upon the specific C—C coupling and HDO catalysts used, but is typically 5 to 20 bar. Given that the upstream and downstream portions are present in a single reactor, the reaction conditions, and in particular the temperature and pressure, are generally the same in the upstream portion and the downstream portion. This is advantageous, as there is no need to change the temperature and/or pressure between the C—C coupling catalyst (upstream) portion and the HDO catalyst (downstream) portion, which increases the overall efficiency of the processes. Inefficient changes in temperature and/or pressure are generally necessary when separate reactors are used for the C—C coupling catalyst and the HDO catalyst.

Any conventional C—C coupling catalyst can be used in the present invention. A C—C coupling catalyst is a catalyst which catalyses reactions which form C—C bonds between hydrocarbon compounds, and thereby increase the number of carbon atoms in the resulting hydrocarbon products.

Typically the C—C coupling catalyst is an aldol condensation and ketonization catalyst (sometimes known as an "aldol catalyst"), which catalysts a reaction in which C—C bonds are formed by (e.g.) aldol condensations. Preferably the aldol condensation and ketonization catalyst comprises $TiO_2$ or $TiO_2$ doped with Au, Ag, Cu, Pd or Ru. Preferably the aldol condensation and ketonization comprises $TiO_2$ doped with Au, Ag, Cu, Pd or Ru, more preferably $TiO_2$ doped with Au or Ru. Typically the Au, Ag, Cu, Pd or Ru is present in an amount of 0.1 to 0.3 wt %, for example about 0.2 wt %.

Typically C—C coupling catalyst as described above is in the form of pellets.

Any conventional HDO catalyst may be used in the present invention (both in the fixed bed tandem catalytic-upgrading reactor and, when present, in the fast hydropyrolysis or hydropyrolysis or fast pyrolysis reactor). An HDO catalyst catalyses reactions in which oxygen is removed from oxygen-containing compounds by reaction of the oxygen-containing compounds with $H_2$ to form water. For example, in the present invention oxygen-containing hydrocarbon products of the C—C coupling reactions react with $H_2$, thereby removing oxygen from those hydrocarbons and generating water.

Typically the HDO catalyst comprises (a) Fe—S, Ni—Co or Co—Mo supported on a support, or (b) $M^1$—$MoM^2P$ supported on support, wherein $M^1$ and $M^2$ represent transition metals. Typically the HDO catalyst is in the form of pellets. The $M^1$—$MoM^2P$ supported on support is preferred as an HDO catalyst.

$M^1$ and $M^2$ represent different transition metals.

$M^1$ generally acts as a promotor in the HDO catalyst. A promotor is component which has little or no catalytic effect itself, but improves the performance of the catalyst in which it is present. Thus, in the present case, $M^1$ typically improves the performance of the HDO catalyst, without generally catalysing the HDO reactions itself. Typically, $M^1$ represents Rh, Ru, Pt, Pd, Ni, Co or Cu, and preferably represents Ru.

Typically, $M^2$ represents Ni, Co, Fe or Cu, and preferably represents Fe.

The molar ratio of Mo:$M^2$:P is 0.8-1.2:0.8-1.2:0.8-1.2, typically about 1:1:1. $M^1$ is typically present in an amount of about 0.05 to about 0.1 wt %, based on the total weight of $M^1$—MoM$^2$P. The Mo, $M^2$ and P are typically atomically dispersed on the surface of the acid support. The $M^1$ typically forms a nano-layer (or single atom layer) on the surface of the Mo, $M^2$, P and acid support.

Any conventional support suitable for catalysts can be used, and will generally be one with a high surface area. Typically the support is an acidic oxide such as $Al_2O_3$, $TiO_2$, $ZrO_2$ or $CeO_2$, a carbon material such as activated carbon, mesoporous carbon or carbon nanomaterials, or $SiO_2$. Preferably the support is $Al_2O_3$, most preferably $\gamma$-$Al_2O_3$.

Thus, a preferred HDO catalyst is Ru—MoFeP supported on $Al_2O_3$. Typically the $Al_2O_3$ is $\gamma$-$Al_2O_3$. Preferably the ratio or Mo:Fe:P is preferably 1:1:1. Ru is preferably present in an amount of about 0.05 to about 0.5 wt %, more preferably about 0.05 to about 0.1 wt %, for example about 0.1 wt %, based on the total weight of Ru, Mo, Fe and P.

$M^1$—MoM$^2$P catalysts can be prepared by a modified Pichini method, for example that described in Example 2. In summary, the method typically involves a sequential wetness impregnation technique. For example, the Mo, $M^2$ and P components are first added to a solution (typically a citric acid solution) in the desired amounts, this solution is then used to impregnate an acid support (such as $Al_2O_3$). Following impregnation, the coated support is dried and calcined. Next, a solution containing the desired amount of $M^1$ is used to impregnate the coated acidic support, followed by a second drying and calcination step. Finally, the active catalyst is obtained by heating (typically in the presence of $H_2$ and $N_2$) to convert the $M^1$, Mo, $M^2$ and P components into elemental form.

$H_2$ is typically introduced into the fixed bed tandem catalytic-upgrading reactor, in order to promote the HDO reactions. Generally, any such $H_2$ added to the fixed bed tandem catalytic-upgrading reactor will have been generated in the sorption enhanced steam reforming step described further below.

The bio-vapour and/or bio-oil entering the fixed bed tandem catalytic-upgrading reactor first comes into contact with the C-Caldol catalyst in the upstream portion of the fixed bed. The C—C coupling catalyst promotes reactions (e.g. aldol condensations) which convert light oxygenates into heavier compounds containing higher numbers of carbon atoms. Next, the materials generated following the bio-vapour and/or bio-oil contacting the C—C coupling catalyst will come into contact with the HDO catalyst in the downstream portion of the fixed bed. The HDO catalysts promotes hydrodeoxygenation reactions, thereby reducing the oxygen content of the resulting effluent that leaves the fixed bed tandem catalytic-upgrading reactor.

Upgrading using the fixed bed tandem catalytic-upgrading reactor provides (i) the biofuel, and (ii) a stream comprising $C_1$-$C_4$ hydrocarbons, CO and $CO_2$. Typically, (i) and (ii) exit the fixed bed tandem catalytic-upgrading reactor together as a combined mixture or effluent containing both (i) and (ii). The effluent is typically condensed and (i) is separated from (ii). Typically, (i) is a relatively low oxygen, high energy density bio-fuel product, which may be directly used in many applications without further upgrading or processing. Stream (ii) comprising $C_1$-$C_4$ hydrocarbons, CO and $CO_2$ from the upgrading step may further comprise oxygenates which were not converted into (i) biofuel.

The stream comprising $C_1$-$C_4$ hydrocarbons, CO and $CO_2$ from the upgrading step is next subjected to sorption enhanced steam reforming (SESR). SESR is an integrated process involving steam reforming of a stream comprising $C_1$-$C_4$ hydrocarbons, CO and $CO_2$ in the presence of a sorbent suitable for $CO_2$ capture, thereby to produce $H_2$. The SESR reactor contains the catalyst required for the steam reforming process together with a sorbent suitable for $CO_2$ capture for the in-situ removal of carbon dioxide from the gaseous phase. The steam reforming [including water gas shift (WGS)] and $CO_2$ capture reactions are thus conducted simultaneously in one single reactor.

The steam reforming aspect of this step uses a steam reforming catalyst, such as Ni, Co or Ni—Co, or noble metal (i.e. Pt, Pd, Ru, Rh) promoted versions of Ni, Co or Ni/Co. Pd promoted Ni—Co (i.e. Pd/Ni—Co) is particularly preferred. Ni catalysts are commonly used in steam reforming processes because they have high activity and selectivity towards hydrogen products. However, Ni catalysts do not offer particularly high resistance to the deactivation caused by coke deposition on nickel particles[24]. In previous work from the inventors, a Pd/Ni—Co catalyst derived from a hydrotalcite-like material (HT) has been demonstrated to be an effective catalyst[25,26,27,22] with high activity and selectivity towards hydrogen products and high resistance to deactivation caused by coke deposition. In particular, this Pd/Ni—Co catalyst is a highly active catalyst per weight as well as volume, has proper redox properties and spatial confinement against sintering, and is superior to the commercial reforming catalysts. The Pd/Ni—Co catalyst can therefore be advantageously used in the SESR techniques of the present invention.

Steam reforming involves the reaction of $C_1$-$C_4$ hydrocarbons and CO with water to provide hydrogen and $CO_2$. The reactions involved can be illustrated for methane as follows:

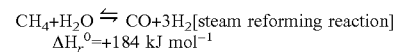
$$CH_4 + H_2O \rightleftharpoons CO + 3H_2 \text{[steam reforming reaction]}$$
$$\Delta H_r^0 = +184 \text{ kJ mol}^{-1}$$

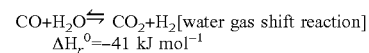
$$CO + H_2O \rightleftharpoons CO_2 + H_2 \text{[water gas shift reaction]}$$
$$\Delta H_r^0 = -41 \text{ kJ mol}^{-1}$$

Both of the above reactions are reversible, and so the reactions can be driven towards $H_2$ production by removal of $CO_2$. Removal of $CO_2$ is achieved by conducting the steam reforming steps in the presence of a sorbent suitable for $CO_2$ capture. The sorbent reacts with the $CO_2$, generally as soon as it is formed, thereby driving the equilibrium towards $H_2$ production.

Any sorbent that is suitable for $CO_2$ capture can be used, but generally CaO-based sorbents are preferred. Natural limestone (primarily $CaCO_3$) and dolomite (primarily $CaCO_3.MgCO_3$) based sorbents being particularly preferred due to their low cost and ready availability (despite suffering from a decay in their $CO_2$ capture capacity after several cycles of carbonation/regeneration[23]). These natural materials can be converted into their oxides by heating, thereby to provide the sorbent.

For example, a sorbent material can be prepared from limestone ($CaCO_3$) by heating it to provide CaO (and $CO_2$). The CaO sorbent can then react with $CO_2$ to reform the $CaCO_3$,

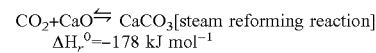
$$CO_2 + CaO \rightleftharpoons CaCO_3 \text{[steam reforming reaction]}$$
$$\Delta H_r^0 = -178 \text{ kJ mol}^{-1}$$

thereby removing the $CO_2$ from the atmosphere. This reaction occurs at low $CO_2$ partial pressures and at moderate temperatures and has fast kinetics and good adsorption capacities. When desired, the CaO sorbent can be regenerated from the thus-formed $CaCO_3$ by heating, with the relatively pure stream of $CO_2$ produced as a by-product being suitable for other uses or sequestration.

Figure 2A:
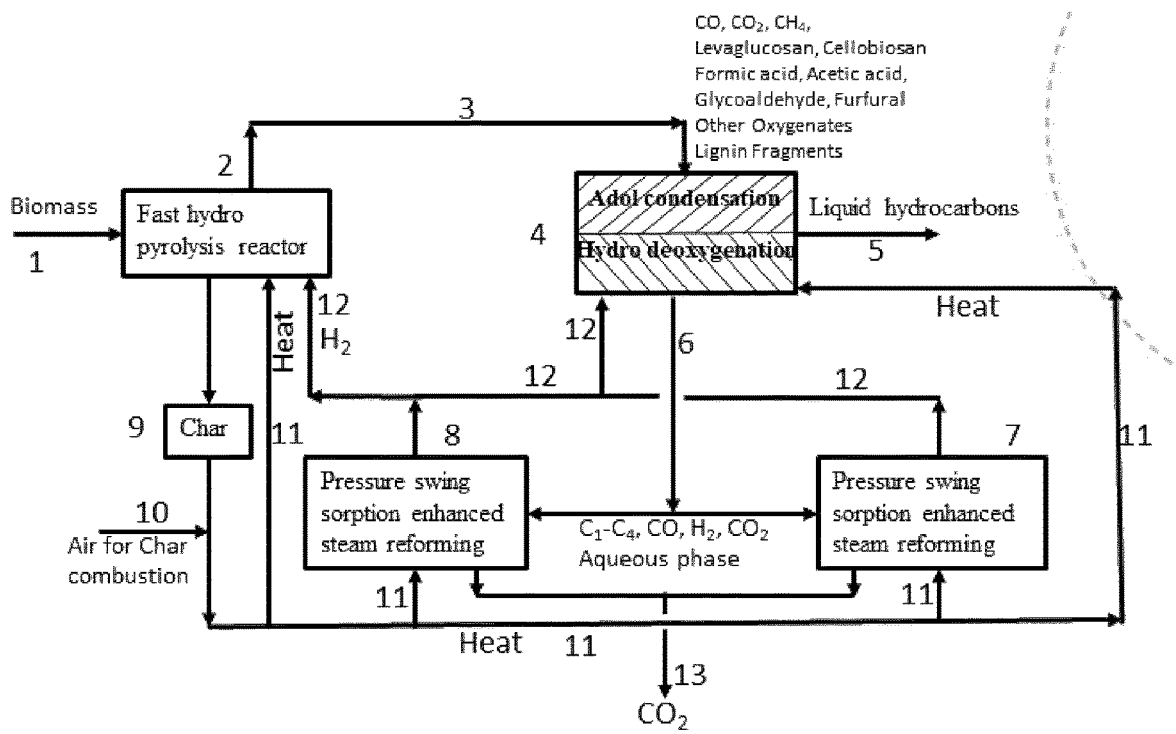
FIG. 2A is a schematic view of the synergistic integration of biofuel (liquid hydrocarbon) synthesis with high yield and purity by fast hydropyrolysis biomass followed by upgrading using a fixed bed tandem catalytic-upgrading reactor, wherein C—C coupling and hydrodeoxygenation reactions occurs in two stages and in a single reactor.

Given the reversibility of the sorbent reaction, it is particularly preferred to use temperature or pressure swing sorption enhanced steam reforming (PS SESR), with PS SESR preferred. A typical arrangement for PS SESR involves a first reactor and a second reactor (as depicted in FIGS. 1A and 2A). Initially, steam reforming and $CO_2$ sorption occurs in the first reactor, whilst sorbent regeneration occurs in a second reactor. At an appropriate point (e.g. when the sorbent in the first reactor has all absorbed $CO_2$ and/or sorbent regeneration is complete in the second reactor), the reactors are switched so that sorbent regeneration instead starts to occur in the first reactor and steam reforming and $CO_2$ sorption occurs in the second reactor. The process of switching between reactors can be continued. In this way, a continual stream of $H_2$ can be produced without needing to interrupt the process (i.e. PS SESR is a continuous process).

Figure 1B:
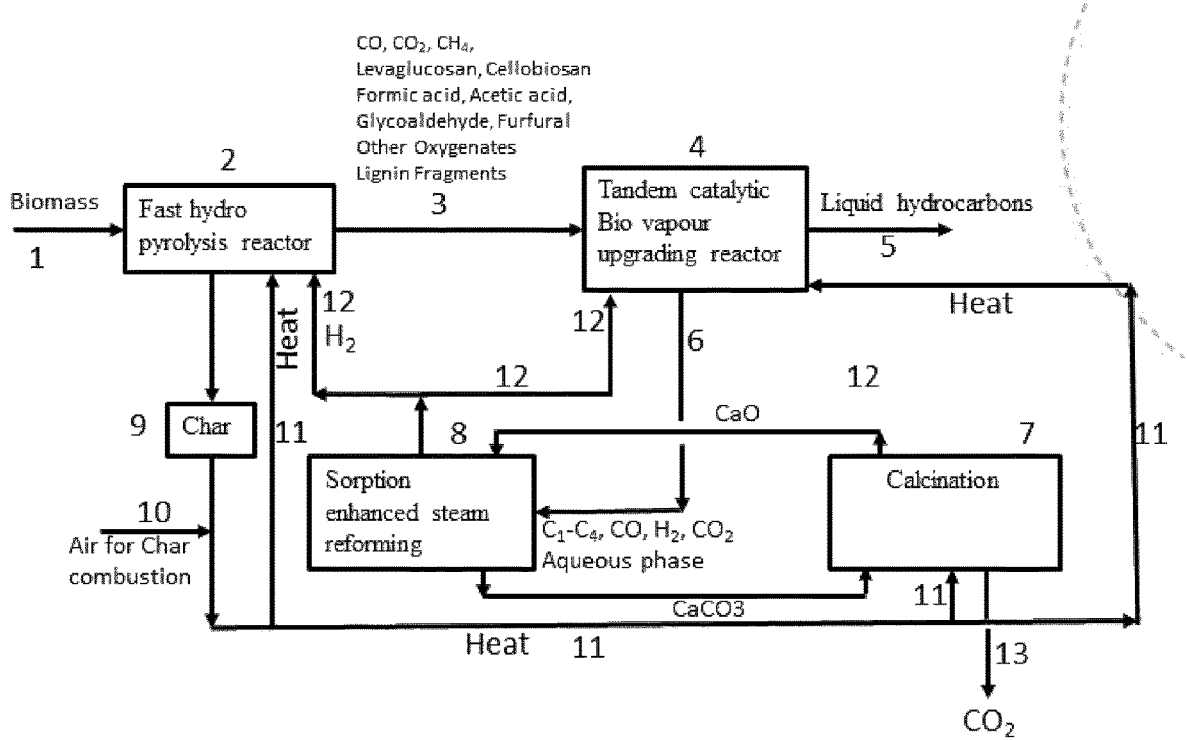
FIG. 1B is a schematic view of the synergistic integration of biofuel (liquid hydrocarbon) synthesis by fast hydropyrolysis of biomass using carbonate looping by a circulating fluidized-bed (CFB) reactor to produce $H_2$.
Figure 2B:
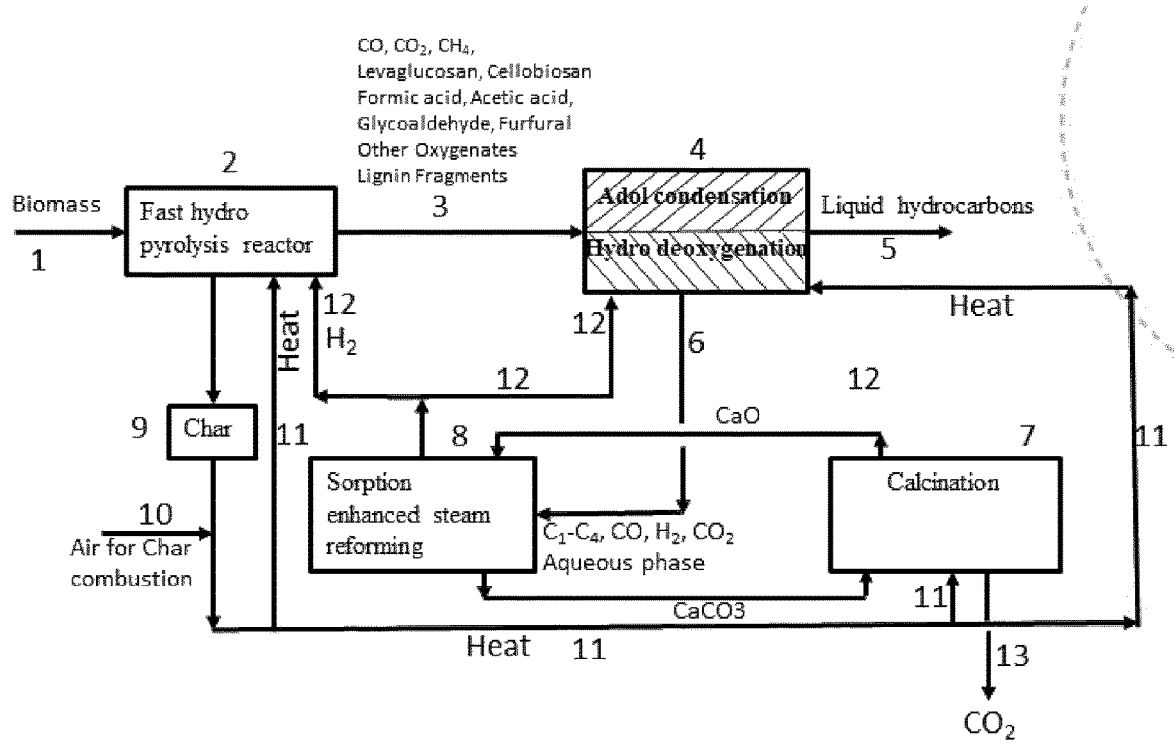
FIG. 2B is a schematic view of the synergistic integration of biofuel (liquid hydrocarbon) synthesis with high yield and purity by fast hydropyrolysis biomass followed by upgrading using a fixed bed tandem catalytic-upgrading reactor, wherein C—C coupling and hydrodeoxygenation reactions occurs in two stages and in a single reactor.

The $H_2$ production can alternatively be done based on carbonate looping by a circulating fluidized-bed (CFB) reactor (as depicted in FIGS. 1B and 2B), where one fluidized-bed acts as a reformer where steam reforming, water gas shift and $CO_2$ removal by the solid sorbent occurs simultaneously and the other release $CO_2$ from the solid sorbent (thereby regenerating the sorbent). The solid sorbent circulates between the two reactors.

The use of SESR in the manner described above has a number of significant advantages compared to, for example, standard steam reforming. First, the amount of hydrogen produced increases, due to the reversible reactions being driven towards hydrogen production. Second, the hydrogen that is produced contains very little residual $CO_2$, and so generally can be fed directly back into the fast hydropyrolysis process without further purification. Finally, the use of carbon from the starting biomass to generate hydrogen increases the overall energy efficiency of the process. The use of PS SESR has the additional advantage that the process does not need to be interrupted for sorbent regeneration, and is therefore highly efficient. Further, the resulting $H_2$ is at relatively high pressure and so can generally be introduced directly into the fast hydropyrolysis process without the need for re-pressurisation.

The $H_2$ produced by SESR is then typically introduced into the fast hydropyrolysis reactor, though some $H_2$ may also be introduced into the fixed bed tandem catalytic-upgrading reactor. The overall process is thus circular and continuous, and consequently is generally highly efficient.

EXAMPLES

The following are Examples that illustrate the present invention. However, these Examples are in no way intended to limit the scope of the invention.

Example 1

Figure 3:
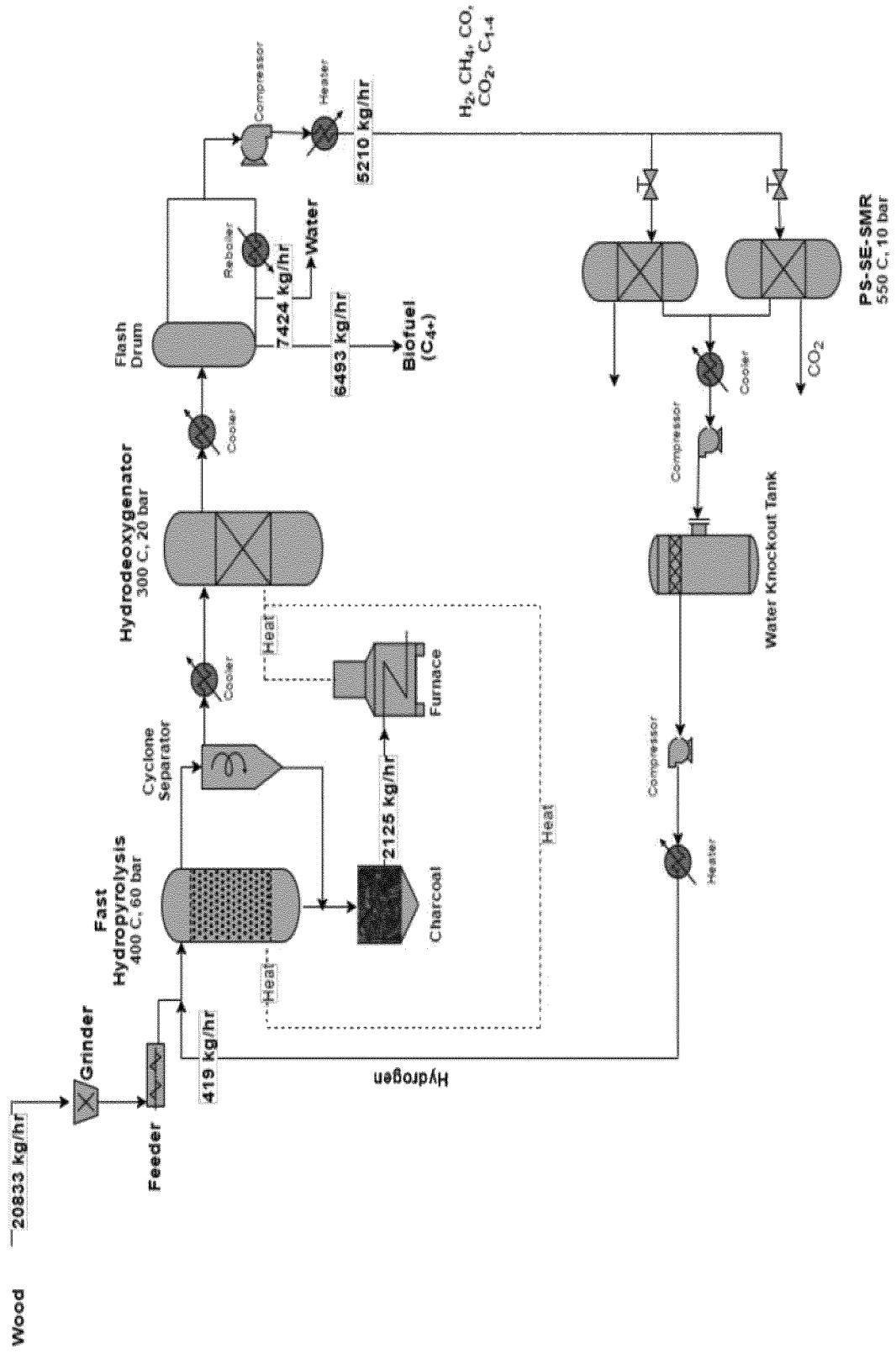
FIG. 3 is a schematic view of a specific process of the invention described in Example 1.

Integration of $H_2$ production from CO and $C_1$-$C_4$ from an HDO reactor with FHP is presented is represented in FIG. 3. The pure hydrogen is produced by pressure swing sorption enhanced steam methane reforming (SESR) and is fed to the FHP reactor. This SESR process can produce relatively pure hydrogen and helps increase hydrogen production versus regular steam reforming, by using a solid sorbent material that removes carbon dioxide from the reactor, shifting the water gas equilibrium to favour hydrogen production. Additionally, the charcoal by-product of the fast-pyrolysis process can be combusted and used to provide energy to the plant to reduce energy costs.

Aspen Plus simulation software was used for process modelling. Two parameters were considered in evaluating the bio-fuel production process, carbon efficiency and energy efficiency. The total carbon efficiency of the plant was determined by calculating the amount of the carbon in the feed stream and the amount of carbon in the bio-fuel product. The wood feed has 10750 kg of carbon and the bio-oil ($C_4$+) has 5801 kg of carbon. This gives a carbon efficiency of 54%; if charcoal production is included, the carbon efficiency increases to 73.7%. The biofuel has an ethanol gallon equivalent (ege) of 163.4 ege/ton biomass. The energy efficiency of the process was calculated by finding the total amount of energy produced by the process. Biofuel is assumed to have an energy content of 42.1 MJ/kg whereas biomass only has an energy content of 17.1 MJ/kg. Using the flow rate of biofuel produced, the total energy produced was estimated to be 2.40 million GJ. The total energy used in the plant was calculated as the total energy added to the plant plus the energy content of the biomass. This gave an energy efficiency of 74.9% for the process.

Example 2—Preparation of Ru—MoFeP Supported on $Al_2O_3$

The MoFeP active phase on supported alumina spheres was prepared by a modified Pichini method 51,52 using sequential wetness impregnation method. 0.4M of aqueous citric acid, organic chelating agent, was first prepared to create acidic environment to free the metal salts from precipitating. A 1:1:1 molar concentration of Mo:Fe:P was added stepwise onto the 1M citric acid solution. In typical experiment in which 100 g of alumina sphere[22] were used, the Mo, Fe and P precursor weight used was 37.2, 84.8 and 23.9 grams respectively, representing 20 wt % loading of the active metal phase.

The light yellowish homogenous solution formed was impregnated sequentially on the spherical alumina support within 24 period. The formed catalyst stayed at room temperature overnight and was dried at 100° C. for 12 h. The catalyst was further calcined in air at a heating rate of 1° C./min, with a dwell time at 350° C. of 6 h. 0.1 wt % of Ru was then impregnated onto the calcined catalyst using incipient wetness impregnation method. The Ru promoted catalyst on MoFeP/$Al_2O_3$ was subsequently dried 100° C. (for 4 h) and calcined at 500° C. using 1° C./min heating rate, dwell time at final temperature is was 5 h.

The active phase, Ru—MoFeP, was obtained using temperature reduction method at heating rate of 1° C./min at 250 and 700° C. to react all phosphorus and reduced oxides to metallic form[44-46] in the presence of 75% $H_2$ in Nitrogen.

Example 3

Biofuel was produced from simulated bio-vapour using tandem catalytic upgrading, whereby high yield and purity of the biofuel was achieved by integrating C=C coupling via aldol condensation/dehydration/ring closure reactions and hydrodeoxygenation in one single reactor over dual bed catalyst system.

A simulated bio vapour feed (water, acetic acid, acetol, furfural, phenol, guaiacol and eugenol) was prepared based on the product distribution observed from the pyrolysis of several biomass using pyrolysis gas chromatography mass spectrometry (PyGCMS).

A fixed bed tandem catalytic-upgrading reactor according to the invention was prepared. The aldol catalysts were $TiO_2$ pellets or 0.2 wt % X—$TiO_2$, where X represents Au, Pd or Ru. The X—TiO$_2$ catalysts were prepared by a standard wetness impregnation technique. Ru—FeMoP/Al$_2$O$_3$ was used as the HDO catalyst. The Ru—FeMoP/Al$_2$O$_3$HDO catalyst was applied using spherical alumina support. The active phase was impregnated sequentially on the support using citrate acid as passivating agent as described in Example 2.

The simulated bio vapour feed was then passed through the fixed bed tandem catalytic-upgrading reactor in a pilot plant investigation.

Figure 4:
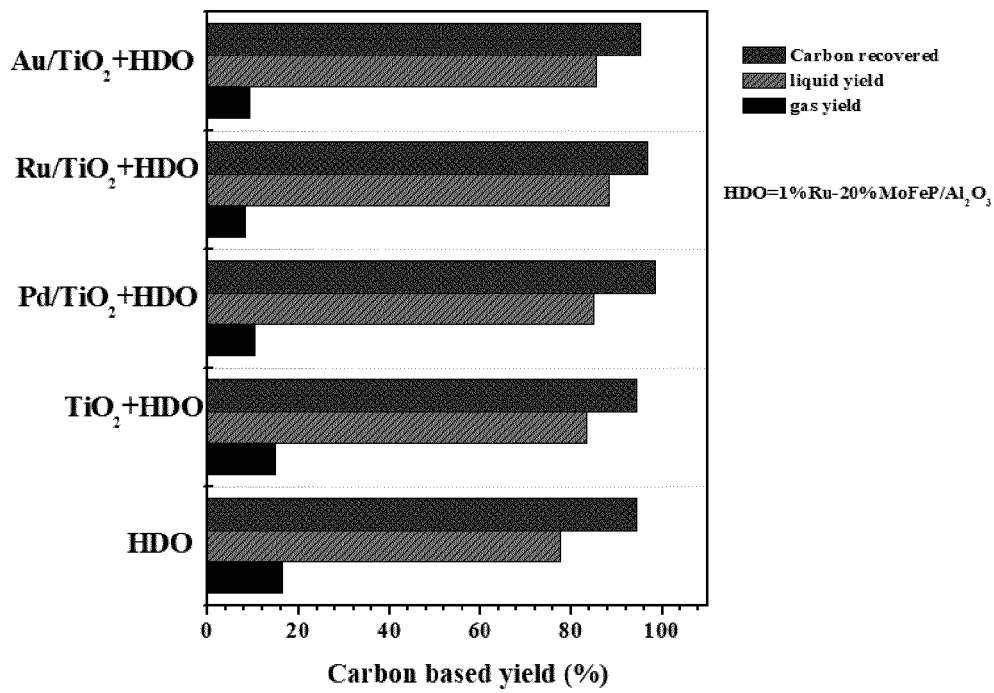
FIG. 4 represents total carbon-based yield obtained based on organic and gaseous product derived from HDO only as compared to tandem catalytic systems, when upgrading simulated bio oil to jet-fuel range aromatics in Example 3. Total pressure 20 bar, $H_2$ partial pressure 17 bar, Temperature of reaction: 400° C., reaction time 6 h, WHSV: 0.49/h, weight of catalyst: HDO (Ru/MoFeP—$Al_2O_3$)=20 g, $XTiO_2$=20 g

In FIG. 4, the overall carbon recovery for all tandem catalyst was greater than 95%. The gas phase yield declined from 17% (for HDO alone) to 9% (Au/TiO$_2$+HDO), with corresponding increases in the liquid yield. The other tandem catalysts also provided a reduction in gas yield and increase in liquid yield, particularly with the doped TiO$_2$ aldol catalysts. The total carbon recovered in the liquid phase was greater than 80% for the tandem catalyst, thus a higher carbon efficiency was attained.

Figure 5:
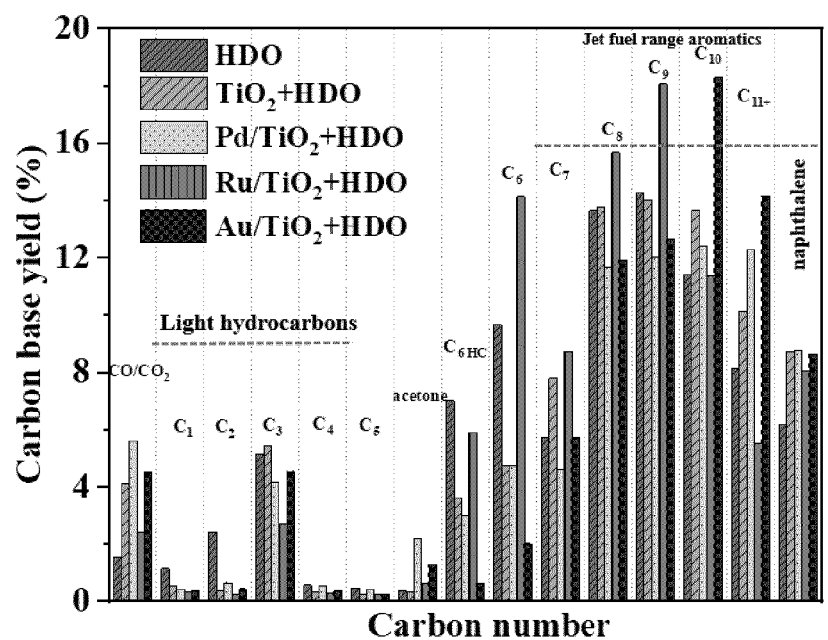
FIG. 5 represents detailed product distribution in the organic and gaseous product stream derived from HDO only as compared to tandem catalytic systems, when upgrading simulated bio oil to jet-fuel range aromatics in Example 3. Total pressure 20 bar, $H_2$ partial pressure 17 bar, Temperature of reaction: 400° C.

FIG. 5 illustrates the detailed hydrocarbon carbon-number yield as a function of the tandem catalysts. Clearly, the selectivity to CO+CO$_2$ was higher for the Pd/TiO$_2$+HDO while C$_3$ (propene and propane) was also greater for only TiO$_2$+HDO. Acetone yield observed was higher for Pd/TiO$_2$+HDO. The increasing in CO$_2$ and acetone possibly suggest that Pd/TiO$_2$ was the most active catalyst for ketonization of acetic acid to acetone, CO$_2$ and water. However, in considering the CO$_2$/C$_0$ molar ratio, which gives indication of the preferred reaction pathway, thus either combined decarboxylation (CO$_2$ release) and ketonization (CO$_2$ release) vs decarbonylation (CO release). The CO$_2$/C$_0$ ratio of 6.8, 5.6, 5.5, 3.4 and 2.7 was observed for Au/TiO$_2$+HDO, Pd/TiO$_2$+HDO, Ru/TiO$_2$+HDO, TiO$_2$ and HDO, respectively. Clearly, decarboxylation and ketonization activity was higher than decarbonylation for these catalysts. In addition, the lower amount of acetone observed for Au as compared to Pd suggest Au/TiO$_2$ promoted much higher carbon coupling activity than Pd based catalyst. Therefore, it is expected that Au based catalyst should have higher chain growth than Pd based catalyst. This was further confirmed in the liquid phase analysis where the C$_{10}$ and C$_{11+}$ carbon yield was higher under Au based upstream catalyst. The polycyclic aromatic formation activity that significantly depends on the HDO catalyst was similar in all dual bed tested catalyst. The observed products once again have higher value in the usage as gasoline additive or jet-fuel blend fuel. The tandem strategy led to reduction in gas phase products while increasing the organic liquid yield with much chain growth observed for Au impregnated catalyst. The high chain growth activity of Au may be due to its mild hydrogenation activity, which is required in condensation reactions. However, Ru based upstream catalyst gave the highest degree of deoxygenation due to the phenolics hydrodeoxygenation ability for Ru/TiO$_2$.

LIST OF REFERENCES

1. Singh, A. P.; Agarwal, A. K.; Agarwal, R. A.; Dhar, A.; Shukla, M. K., Introduction of Alternative Fuels. In Prospects of Alternative Transportation Fuels, Singh, A. P.; Agarwal, R. A.; Agarwal, A. K.; Dhar, A.; Shukla, M. K., Eds. Springer Singapore: Singapore, 2018; pp 3-6.
2. Gutiérrez-Antonio, C.; Gómez-Castro, F. I.; de Lira-Flores, J. A.; Hernández, S., A review on the production processes of renewable jet fuel. *Renewable and Sustainable Energy Reviews* 2017, 79, 709-729.
3. A., A. N. I.; Moiz, B.; Muaz, S.; A., C. H.; M., E. H. M.; O., E. N., Optimization of the Aromatic/Paraffinic Composition of Synthetic Jet Fuels. *Chemical Engineering & Technology* 2016, 39 (12), 2217-2228.
4. Link, D. D.; Gormley, R. J.; Baltrus, J. P.; Anderson, R. R.; Zandhuis, P. H., Potential Additives to Promote Seal Swell in Synthetic Fuels and Their Effect on Thermal Stability. *Energ Fuel* 2008, 22 (2), 1115-1120.
5. Davda, R. R.; Shabaker, J. W.; Huber, G. W.; Cortright, R. D.; Dumesic, J. A., A review of catalytic issues and process conditions for renewable hydrogen and alkanes by aqueous-phase reforming of oxygenated hydrocarbons over supported metal catalysts. *Appl Catal B-environ* 2005, 56 (1-2), 171-186.
6. Corma, A.; Iborra, S.; Velty, A., Chemical routes for the transformation of biomass into chemicals. *Chem Rev* 2007, 107 (6), 2411-2502.
7. Huber, G. W.; Iborra, S.; Corma, A., Synthesis of transportation fuels from biomass: Chemistry, catalysts, and engineering. *Chemical Reviews* 2006, 106 (9), 4044-4098.
8. Carlos Serrano-Ruiz, J.; Dumesic, J. A., Catalytic routes for the conversion of biomass into liquid hydrocarbon transportation fuels. *Energy & Environmental Science* 2011, 4 (1), 83-99.
9. Li, C.; Zheng, M.; Wang, A.; Zhang, T., One-pot catalytic hydrocracking of raw woody biomass into chemicals over supported carbide catalysts: simultaneous conversion of cellulose, hemicellulose and lignin. *Energ Environ Sci* 2012, 5 (4), 6383-6390.
10. Ji, N.; Zhang, T.; Zheng, M.; Wang, A.; Wang, H.; Wang, X.; Chen, J. G., Direct Catalytic Conversion of Cellulose into Ethylene Glycol Using Nickel-Promoted Tungsten Carbide Catalysts. *Angew Chem Int Edit* 2008, 47 (44), 8510-8513.
11. Alonso, D. M.; Bond, J. Q.; Dumesic, J. A., Catalytic conversion of biomass to biofuels. *Green Chem* 2010, 12 (9), 1493-1513.
12. Rytter, E.; Ochoa-Fernández, E.; Fahmi, A., *Catalytic Process Development for Renewable Materials: Biomass-to-Liquids by the Fischer-Tropsch process*. Wiley: 2013.
13. Mohan, D.; Pittman, C. U.; Steele, P. H., Pyrolysis of wood/biomass for bio-oil: A critical review. *Energ Fuel* 2006, 20 (3), 848-889.
14. Zacher, A. H.; Olarte, M. V.; Santosa, D. M.; Elliott, D. C.; Jones, S. B., A review and perspective of recent bio-oil hydrotreating research. *Green Chem* 2014, 16 (2), 491-515.
15. Huber, G. W.; Iborra, S.; Corma, A., Synthesis of transportation fuels from biomass: chemistry, catalysts, and engineering. *Chem Rev* 2006, 106 (9), 4044-98.
16. Resende, F. L. P., Recent advances on fast hydropyrolysis of biomass. *Catalysis Today* 2016, 269, 148-155.
17. Balagurumurthy, B.; Bhaskar, T., Hydropyrolysis of lignocellulosic biomass: state of the art review. *Biomass Conversion and Biorefinery* 2013, 4 (1), 67-75.
18. Thangalazhy-Gopakumar, S.; Adhikari, S.; Gupta, R. B., Catalytic Pyrolysis of Biomass over H+ZSM-5 under Hydrogen Pressure. *Energ Fuel* 2012, 26 (8), 5300-5306.
19. Marker, T. L.; Felix, L. G.; Linck, M. B.; Roberts, M. J.; Ortiz-Toral, P.; Wangerow, J., Integrated hydropyrolysis and hydroconversion (IH2®) for the direct production of gasoline and diesel fuels or blending components from biomass, Part 2: continuous testing. *Environmental Progress & Sustainable Energy* 2014, 33 (3), 762-768.
20. Marker, T. L.; Felix, L. G.; Linck, M. B.; Roberts, M. J., Integrated hydropyrolysis and hydroconversion (1E2) for 20. the direct production of gasoline and diesel fuels or blending components from biomass, part 1: Proof of principle testing. *Environmental Progress & Sustainable Energy* 2012, 31 (2), 191-199.
21. Venkatakrishnan, V. K.; Degenstein, J. C.; Smeltz, A. D.; Delgass, W. N.; Agrawal, R.; Ribeiro, F. H., High-pressure fast-pyrolysis, fast-hydropyrolysis and catalytic hydrodeoxygenation of cellulose: production of liquid fuel from biomass. *Green Chem* 2014, 16 (2), 792-802.
22. Venkatakrishnan, V. K.; Delgass, W. N.; Ribeiro, F. H.; Agrawal, R., Oxygen removal from intact biomass to produce liquid fuel range hydrocarbons via fast-hydropyrolysis and vapor-phase catalytic hydrodeoxygenation. *Green Chemistry* 2015, 17 (1), 178-183.
23. Abanades, J. C., The maximum capture efficiency of $CO_2$ using a carbonation/calcination cycle of $CaO/CaCO_3$. *Chem. Eng. J.* 2002, 90 (3), 303-306.
24. Ayalur Chattanathan, S.; Adhikari, S.; Abdoulmoumine, N., A review on current status of hydrogen production from bio-oil. *Renewable and Sustainable Energy Reviews* 2012, 16 (5), 2366-2372.
25. Noor, T.; Gil, M. V.; Chen, D., Production of fuel-cell grade hydrogen by sorption enhanced water gas shift reaction using Pd/Ni—Co catalysts. *Appl. Catal. B-Environ.* 2014, 150-151 (0), 585-595.
26. Fermoso, J.; Rubiera, F.; Chen, D., Sorption enhanced catalytic steam gasification process: a direct route from lignocellulosic biomass to high purity hydrogen. *Energy Environ. Sci.* 2012, 5 (4), 6358-6367.
27. Fermoso, J.; Gil, M. V.; Rubiera, F.; Chen, D., Multifunctional Pd/Ni—Co Catalyst for Hydrogen Production by Chemical Looping Coupled With Steam Reforming of Acetic Acid. *ChemSusChem* 2014, 7 (11), 3063-3077.
28. Du, J.; Say, R. F.; Lü, W.; Fuchs, G.; Einsle, O., Active-site remodelling in the bifunctional fructose-1,6-bisphosphate aldolase/phosphatase. *Nature* 2011, 478, 534.
29. Xia, Q. N.; Cuan, Q.; Liu, X. H.; Gong, X. Q.; Lu, G. Z.; Wang, Y. Q., Pd/NbOPO4 multifunctional catalyst for the direct production of liquid alkanes from aldol adducts of furans. *Angewandte Chemie International Edition* 2014, 53 (37), 9755-9760.
30. Gollwitzer, A.; Dietel, T.; Kretschmer, W. P.; Kempe, R., A broadly tunable synthesis of linear α-olefins. *Nature Communications* 2017, 8 (1), 1226.
31. Sutton, A. D.; Waldie, F. D.; Wu, R.; Schlaf, M.; 'Pete' Silks Iii, L. A.; Gordon, J. C., The hydrodeoxygenation of bioderived furans into alkanes. *Nature Chemistry* 2013, 5, 428.
32. Mo, F.; Dong, G., Regioselective ketone α-alkylation with simple olefins via dual activation. *Science* 2014, 345 (6192), 68-72.
33. Ose, T.; Watanabe, K.; Mie, T.; Honma, M.; Watanabe, H.; Yao, M.; Oikawa, H.; Tanaka, I., Insight into a natural Diels-Alder reaction from the structure of macrophomate synthase. *Nature* 2003, 422, 185.
34. Anbarasan, P.; Baer, Z. C.; Sreekumar, S.; Gross, E.; Binder, J. B.; Blanch, H. W.; Clark, D. S.; Toste, F. D., Integration of chemical catalysis with extractive fermentation to produce fuels. *Nature* 2012, 491, 235.
35. Climent, M. J.; Corma, A.; Iborra, S., Conversion of biomass platform molecules into fuel additives and liquid hydrocarbon fuels. *Green Chemistry* 2014, 16 (2), 516-547.
36. Young, Z. D.; Hanspal, S.; Davis, R. J., Aldol Condensation of Acetaldehyde over Titania, Hydroxyapatite, and Magnesia. *ACS Catalysis* 2016, 6 (5), 3193-3202.
37. Sun, D.; Moriya, S.; Yamada, Y.; Sato, S., Vapor-phase self-aldol condensation of butanal over Ag-modified $TiO_2$. *Applied Catalysis A: General* 2016, 524, 8-16.
38. Gayubo, A. G.; Aguayo, A. T.; Atutxa, A.; Aguado, R.; Olazar, M.; Bilbao, J., Transformation of oxygenate components of biomass pyrolysis oil on a HZSM-5 zeolite. II. Aldehydes, ketones, and acids. *Industrial & Engineering Chemistry Research* 2004, 43 (11), 2619-2626.
39. Gurbuz, E. I.; Kunkes, E. L.; Dumesic, J. A., Dual-bed catalyst system for C—C coupling of biomass-derived oxygenated hydrocarbons to fuel-grade compounds. *Green Chemistry* 2010, 12 (2), 223-227.
40. Mortensen, P. M.; Grunwaldt, J.-D.; Jensen, P. A.; Jensen, A. D., Screening of Catalysts for Hydrodeoxygenation of Phenol as a Model Compound for Bio-oil. *ACS Catalysis* 2013, 3 (8), 1774-1785.
41. Whiffen, V. M. L.; Smith, K. J.; Straus, S. K., The influence of citric acid on the synthesis and activity of high surface area MoP for the hydrodeoxygenation of 4-methylphenol. *Applied Catalysis A: General* 2012, 419, 111-125.
42. Peroni, M.; Lee, I.; Huang, X.; Baráth, E.; Gutiérrez, O. Y.; Lercher, J. A., Deoxygenation of Palmitic Acid on Unsupported Transition-Metal Phosphides. *ACS Catalysis* 2017, 7 (9), 6331-6341.
43. Bonita, Y.; Hicks, J. C., Periodic Trends from Metal Substitution in Bimetallic Mo-Based Phosphides for Hydrodeoxygenation and Hydrogenation Reactions. *The Journal of Physical Chemistry C* 2018, 122 (25), 13322-13332.
44. Rensel, D. J.; Rouvimov, S.; Gin, M. E.; Hicks, J. C., Highly selective bimetallic FeMoP catalyst for C—O bond cleavage of aryl ethers. *Journal of Catalysis* 2013, 305, 256-263.
45. Rensel, D. J.; Kim, J.; Jain, V.; Bonita, Y.; Rai, N.; Hicks, J. C., Composition-directed FeXMo2-XP bimetallic catalysts for hydrodeoxygenation reactions. *Catalysis Science & Technology* 2017, 7 (9), 1857-1867.
46. Rensel, D. J.; Kim, J.; Bonita, Y.; Hicks, J. C., Investigating the multifunctional nature of bimetallic FeMoP catalysts using dehydration and hydrogenolysis reactions. *Applied Catalysis A: General* 2016, 524, 85-93.
47. Jain, V.; Bonita, Y.; Brown, A.; Taconi, A.; Hicks, J. C.; Rai, N., Mechanistic insights into hydrodeoxygenation of phenol on bimetallic phosphide catalysts. *Catalysis Science & Technology* 2018, 8 (16), 4083-4096.
48. Elliott, D. C.; Hart, T. R., Catalytic Hydroprocessing of Chemical Models for Bio-oil. *Energ Fuel* 2009, 23 (2), 631-637.
49. W., N. M.; H., S. B., A Perspective on Catalytic Strategies for Deoxygenation in Biomass Pyrolysis. *Energy Technology* 2017, 5 (1), 7-18.
50. Si, Z.; Zhang, X.; Wang, C.; Ma, L.; Dong, R., An Overview on Catalytic Hydrodeoxygenation of Pyrolysis Oil and Its Model Compounds. 2017, 7 (6), 169.
51. Zhao, T.; Boullosa-Eiras, S.; Yu, Y.; Chen, D.; Holmen, A.; Ronning, M. J. T. i. C., Synthesis of Supported Catalysts by Impregnation and Calcination of Low-Temperature Polymerizable Metal-Complexes. 2011, 54 (16), 1163.
52. Boullosa-Eiras, S.; Zhao, T.; Chen, D.; Holmen, A., Effect of the preparation methods and alumina nanoparticles on the catalytic performance of Rh/ZrxCe1-xO2-$Al_2O_3$ in methane partial oxidation. *Catalysis Today* 2011, 171 (1), 104-115.

The invention claimed is:

1. A hydrodeoxygenation (HDO) catalyst which is Ru—MoFeP supported on $Al_2O_3$.

2. A fixed bed tandem catalytic-upgrading reactor suitable for upgrading bio-vapour or bio-oil from fast hydropyrolysis or fast pyrolysis into biofuel, wherein:
   the fixed bed comprises an upstream portion and a downstream portion,
   the upstream portion comprises an C—C coupling catalyst, and
   the downstream portion comprises the hydrodeoxygenation (HDO) catalyst according to claim 1.

3. The fixed bed tandem catalytic-upgrading reactor according to claim 2, wherein the C—C coupling catalyst is an aldol condensation and ketonization catalyst.

4. The fixed bed tandem catalytic-upgrading reactor according to claim 3, wherein the C—C coupling catalyst comprises $TiO_2$ or $TiO_2$ doped with Au, Ag, Cu, Pd or Ru.

5. The fixed bed tandem catalytic-upgrading reactor according to claim 4, wherein the C—C-coupling catalyst comprises $TiO_2$ or $TiO_2$ doped with Ru or Au.

6. A method for preparing biofuel from biomass, the method comprising:
   (a) fast hydropyrolysis or fast pyrolysis of biomass to provide bio-vapour and/or bio-oil; and
   (b) upgrading of the bio-vapour and/or bio-oil from step (a) in a fixed bed tandem catalytic-upgrading reactor to provide (i) the biofuel, and (ii) a stream comprising $C_1$-$C_4$ hydrocarbons, CO and $CO_2$,
   wherein the fixed bed tandem catalytic-upgrading reactor comprises an upstream portion and a downstream portion, the upstream portion comprises an C—C coupling catalyst, and the downstream portion comprises the hydrodeoxygenation (HDO) catalyst according to claim 1.

7. A method for preparing biofuel from biomass, the method comprising:
   (a) fast hydropyrolysis or fast pyrolysis of biomass to provide bio-vapour and/or bio-oil;
   (b) upgrading of the bio-vapour and/or bio-oil from step (a) in a fixed bed tandem catalytic-upgrading reactor to provide (i) the biofuel, and (ii) a stream comprising $C_1$-$C_4$ hydrocarbons, CO and CO, and
   (c) steam reforming the stream comprising $C_1$-$C_4$ hydrocarbons, CO and $CO_2$ from step (b) in the presence of a sorbent suitable for $CO_2$ capture, to provide hydrogen,
   wherein the fixed bed tandem catalytic-upgrading reactor comprises an upstream portion and a downstream portion, the upstream portion comprises an C—C coupling catalyst, and the downstream portion comprises a hydrodeoxygenation (HDO) catalyst.

8. The method according to claim 7, wherein fast hydropyrolysis is used in step (a) and which method further comprises:
   (d) using the $H_2$ produced in step (c) for fast hydropyrolysis in step (a).

9. The method according to claim 7, which further comprises:
   (e) introducing $H_2$ from step (c) into the catalytic-upgrading reactor in step (b).

10. The method according to claim 7, wherein the steam reforming is pressure or temperature swing sorption enhanced steam reforming.

11. The method according to claim 10, wherein the steam reforming is pressure swing sorption enhanced steam reforming (PS SESR), whereby (i) steam reforming and $CO_2$ sorption occurs in a first reactor and sorbent regeneration occurs in a second reactor, and then (ii) sorbent regeneration occurs in the first reactor and steam reforming and $CO_2$ sorption occurs in the second reactor.

12. The method according to claim 7, wherein the steam reforming is based on carbonate looping by a circulating fluidized-bed (CFB) reactor, wherein steam reforming and $CO_2$ sorption occurs in a first reactor and sorbent regeneration occurs in a second reactor, and the sorbent material is circulated between the first reactor and the second reactor.

13. The method according to claim 7, wherein the sorbent comprises CaO.

14. The method according to claim 13, wherein the sorbent is derived from limestone or dolomite.

15. The method according to claim 7, wherein the steam reforming uses a catalyst which is Ni, Co, Ni—Co or noble metal (M: Pt, Pd, Ru, Rh) promoted above catalyst.

16. The method according to claim 15, wherein the steam reforming uses a catalyst which is Pd/Ni—Co.

* * * * *

UNITED STATES PATENT AND TRADEMARK OFFICE
CERTIFICATE OF CORRECTION

PATENT NO. : 11,801,497 B2
APPLICATION NO. : 17/423040
DATED : October 31, 2023
INVENTOR(S) : De Chen et al.

Page 1 of 1

It is certified that error appears in the above-identified patent and that said Letters Patent is hereby corrected as shown below:

In the Claims

Column 17, Claim 7, Line 44 reads:
C1-C4 hydrocarbons, CO and CO, and
Should read:
C1-C4 hydrocarbons, CO and CO2, and Signed and Sealed this
Twentieth Day of February, 2024

Katherine Kelly Vidal
*Director of the United States Patent and Trademark Office*